(12) United States Patent
Jahkonen

(10) Patent No.: US 7,176,653 B2
(45) Date of Patent: Feb. 13, 2007

(54) ELECTRIC MOTOR DRIVE

(75) Inventor: Pekka Jahkonen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 11/433,430

(22) Filed: May 15, 2006

(65) Prior Publication Data
US 2006/0214624 A1 Sep. 28, 2006

Related U.S. Application Data

(63) Continuation of application No. 10/843,292, filed on May 12, 2004, now abandoned, which is a continuation of application No. PCT/FI02/00898, filed on Nov. 13, 2002.

(30) Foreign Application Priority Data
Nov. 14, 2001 (FI) ................................ 20012210

(51) Int. Cl.
H02P 27/04 (2006.01)

(52) U.S. Cl. ...................... 318/807; 318/503; 318/801; 318/803

(58) Field of Classification Search ...................... None
See application file for complete search history.

(56) References Cited

U.S. PATENT DOCUMENTS 4,482,031 A 11/1984 Yoshida et al.

(Continued)

FOREIGN PATENT DOCUMENTS

EP 1037354 A2 11/2000
JP 63064595 A 3/1998

(Continued)

OTHER PUBLICATIONS

Google translation tools www.google.com/language_tools?hl=en.*

(Continued)

Primary Examiner—Lincoln Donovan
Assistant Examiner—Renata McCloud
(74) Attorney, Agent, or Firm—Birch, Stewart, Kolasch & Birch, LLP

(57) ABSTRACT

The invention relates to an electric motor drive for operating an alternating-current motor. The electric motor drive comprises a frequency converter for controlling the motor, which frequency converter comprises a rectifier and an inverter implemented using semiconductor switches arranged in a bridge, and an intermediate circuit placed between the rectifier and the inverter and comprising a capacitor. According to the invention, the electric motor drive additionally comprises two regulating units, the first one of which contains an inductor unit provided at the input of the frequency converter and at the same time at the input of the rectifier, the inductors comprised in the unit being connected to each phase; and an intermediate circuit with a low-value capacitor, of the order of 50 µF, while the second one contains an auxiliary switch, to which the supply of electric power is arranged to occur via a safety relay, the auxiliary switch being so connected to selected semiconductor switches of the inverter bridge that the control signal for a selected semiconductor switch will pass via the auxiliary switch when the latter is in a conducting state; and a current measuring unit for measuring and/or monitoring the supply current to the electric motor.

23 Claims, 3 Drawing Sheets

U.S. PATENT DOCUMENTS

| | | |
|---|---|---|
| 5,825,641 A | 10/1998 | Mangtani |
| 6,009,003 A | 12/1999 | Yeo |
| 6,041,625 A | 3/2000 | Nagai et al. |
| 6,367,273 B2 | 4/2002 | Takagi et al. |
| 6,801,441 B2 | 10/2004 | Salama |
| 6,850,426 B2 | 2/2005 | Kojori et al. |

FOREIGN PATENT DOCUMENTS

WO     WO-2001158000 A1     8/2001

OTHER PUBLICATIONS

Translation of ep 1037354 from Google.*

* cited by examiner

ELECTRIC MOTOR DRIVE

This application is a continuing application based on U.S. application Ser. No. 10/843,292, filed May 12, 2004, now abandoned which application is a Continuation of co-pending PCT International Application No. PCT/FI02/00898 filed on Nov. 13, 2002, which designated the United States, and on which priority is claimed under 35 U.S.C. § 120, and 35 U.S.C. § 119(a) on patent application Ser. Nos. FI200112210 filed in Finland on Nov. 14, 2001, the entire contents of which are hereby incorporated by reference.

BACKGROUND OF THE INVENTION

The present invention relates to an alternating-current electric motor drive, designed especially for an elevator.

FIG. 1 visualizes a prior-art electric motor drive for an elevator, which is applicable for the control and regulation of an alternating-current motor, preferably a three-phase motor 1. The electric motor drive comprises a frequency converter 2 containing a rectifier 21 and an inverter 22, which are connected together via an intermediate circuit 23. The input of the rectifier 21 is connected to an alternating-current power source, such as a three-phase power source, such as an electric network SV, and its output produces a direct voltage $U_C$ for the intermediate circuit, this voltage having either an adjustable or a constant magnitude. The intermediate circuit comprises a capacitor 23a with a large value, generally an electrolytic capacitor, which is connected between the output terminals of the rectifier 21, the direct voltage $U_C$ being applied across its terminals. The direct voltage $U_C$ is fed to the input of the inverter 22.

The frequency converter 2 also comprises an inverter control unit 24; 24b, by means of which the operation of the inverter 22 and further the electric motor 1 are controlled. If the rectifier 21 is implemented using diode bridges, then its operation is not controlled and it needs no separate control unit. If the rectifier 21 contains controllable semiconductor switches, then the rectifier 21 needs to be provided with a control unit 24; 24a, which is used to control the operation of the rectifier 21 and especially the magnitude of the intermediate-circuit direct voltage $U_C$. By means of the inverter 22, controlled by the control unit 24; 24b, a three-phase voltage and current of adjustable frequency is produced for the electric motor 3 so that the rotational speed of the motor can be varied between zero and a predetermined maximum speed. The inverter 22 is also used to choose the phase sequence, i.e. the direction of rotation of the motor.

Both the rectifier 21 and the inverter 22 are generally implemented using semiconductor switches. Such semiconductor switches include e.g. the thyristor, triac, MOSFET and IGBT (Insulated-gate Bipolar Transistor). The rectifier and the inverter are preferably implemented as identical IGBT (Insulated-gate Bipolar Transistor) bridge circuits. FIG. 2 visualizes such a bridge circuit. The bridge circuit comprises six IGB transistors 3; $3^1$, $3^2$, $3^3$, $3^4$, $3^5$, $3^6$, FIG. 3, connected pairwise in parallel. When the IGBT bridge circuit is arranged to function as a rectifier 21, each supply voltage phase R, S, T is connected to the rectifier input IN1 between the transistors of a corresponding IGB transistor pair $3^1$, $3^2$; $3^3$, $3^4$; $3^5$, $3^6$ and over these to the positive and negative terminals of the output OUT1 of the rectifier. When the IGBT bridge circuit is arranged to function as an inverter 22, its input and output terminals are connected the other way round as IN2, OUT2 than in the rectifier configuration; the intermediate-circuit direct-current voltage $U_C$ is applied across the IGB transistor pairs connected in parallel to input IN2, and each alternating-current phase voltage at the output OUT2 is obtained from a point between the transistors of the respective transistor pair.

Provided on the input and output sides, i.e. on the power source side and the motor side, respectively, of the frequency converter 2 are first and second contactors 4, 5. Both contactors have a number of switches corresponding to the number of phases, in this case three switches. Via the first or input contactors 4, the frequency converter 2 is connected to different phases R, S, T of the alternating-current power source, preferably an electric network SV. Similarly, via the second contactors 5, the electric motor 1 is connected to the output terminals of the frequency converter 2. When the contactors 4, 5 are open, no electric power is transferred from the power source via the frequency converter 2 to the motor 1. When the contactors 4, 5 are closed, electricity is supplied from the power source SV to the motor 1. The first and the second contactors 4, 5 are preferably controlled by means of a common control switch 15. The control switch 15 is closed when the contactors 4, 5 are to be closed to start the supply of power to the motor (and similarly the contactors 4, 5 are opened when supply of power to the motor 1 is to be interrupted). The main purpose of the switch arrangement described above, especially in an elevator application, is to guarantee safe operation of the electric motor and the elevator as a whole.

A problem with the use of contactors 4, 5 is that they require regular maintenance and that they have a limited service life (e.g. 2 years). An additional drawback is the noise produced by the operation of the contactors, which is generated by the fast movement and sudden stopping of the connection elements of the contactor. Further problems result from electromagnetic disturbances of the contactors. The contactors also increase the price of the electric motor drive.

Previously known from European patent application EP-1037354 is an electric motor drive for an elevator, which in principle corresponds to the motor drive presented in FIG. 1, with the following differences. No contactors are provided between the inverter and the electric motor. The control pulses to each semiconductor switch IGBT of the inverter bridge circuit are supplied via an optoswitch in which the voltage supply to its light emitting diode is additionally monitored and controlled via a safety relay. When the safety relay is actuated, the supply of voltage to the light emitting diode is interrupted and the control pulses sent by the control unit cannot pass through the optoswitch to the gate G of the semiconductor switch IGBT. The supply of power to the motor via the inverter is interrupted and the motor stops.

A drawback with the electric motor drive according to the aforesaid EP application is that it only provides a partial solution to the contactor problems described above. Furthermore, the inverter input is provided with contactors over which alternating-current electricity is supplied from a three-phase network to the frequency converter and further to the electric motor.

SUMMARY OF THE INVENTION

The present invention eliminates the problems associated with the use of contactors in general. The invention aims at achieving a new reliable and safe electric motor drive. A specific aspect of the invention is to implement an electric motor drive for an elevator or equivalent so as to enable an electric motor used as a power means to be connected to an electric power source and likewise to be disconnected from the electric power source in a manner involving no use of contactors at all.

The electric motor drive of the invention for operating an alternating-current motor comprises a frequency converter for controlling the motor, said frequency converter comprising a rectifier and an inverter implemented using semiconductor switches arranged as a bridge circuit, and an intermediate circuit placed between the rectifier and the inverter and provided with a capacitor. According to the invention, the electric motor drive additionally comprises two regulating units, the first one of which contains: an inductor unit provided at the input of the frequency converter and at the same time at the input of the rectifier, the inductors in the unit being connected to each phase; and an intermediate circuit with a low-value capacitor, of the order of 50 µF; and the second one contains: an auxiliary switch, to which the supply of electric power is arranged to occur via a safety relay, said auxiliary switch being so connected to each semiconductor switch of the inverter bridge that the control signal for each semiconductor switch will pass via the auxiliary switch when it is in a conducting state; and a current measuring unit for measuring the supply current to the electric motor.

In the one embodiment of the invention, the second control unit contains: an auxiliary switch, the supply of electric power to which is arranged to occur via a safety relay and which is so connected to each semiconductor switch in the upper bridge of the inverter that the control signal for each semiconductor switch will pass via the auxiliary switch when it is in a conducting state; a current measuring unit for monitoring and/or measuring the supply current to the electric motor; and a current monitoring unit connected to each semiconductor switch in the lower bridge of the inverter.

The most important advantage of the invention is that the electric motor drive can be implemented without contactors, i.e. without mechanical switching elements. This means an improvement in reliability because the electric motor drive no longer has any moving switching elements subject to wear; these are replaced with electronic circuits and/or components. The invention provides the advantage of eliminating the noise problem caused by mechanical contactors. The invention has the advantage that the elimination of mechanical contactors allows savings to be achieved in installation and maintenance costs.

The invention also has the advantage that the operating temperature of the electric motor drive can be clearly increased, most preferably from the earlier limit of 20° C. up to 100° C. The size of the cooling elements can be reduced, which leads to savings in space and costs.

A further advantage of the invention is that a low-value capacitor, e.g. 50 µF, is used in the intermediate circuit of the frequency converter. These capacitors are plastic or paper capacitors, which are durable and cheap. The capacitors previously used in this circuit are wet high-value capacitors, typically 1000 µF, of electrolytic construction. These components are subject to wear and have to be renewed relatively often.

As for the other advantages of the invention, the following general remarks apply. The harmonic distortion of the electric motor drive can be reduced because the value of the intermediate circuit capacitor is clearly reduced as compared with prior art. In addition, dynamic braking of the electric motor is made possible without any additions to the technical equipment. Dynamic braking is based on a new arrangement for controlling the inverter in the most preferred embodiment of the invention.

BRIEF DESCRIPTION OF DRAWINGS

In the following, the invention and its other advantages will be described in detail with reference to the attached drawing, wherein

FIGS. 1, 2 and 3 are described above in the description of prior art. In the following, the invention will be considered with reference especially to FIGS. 4–7.

DETAILED DESCRIPTION

Figure 1:
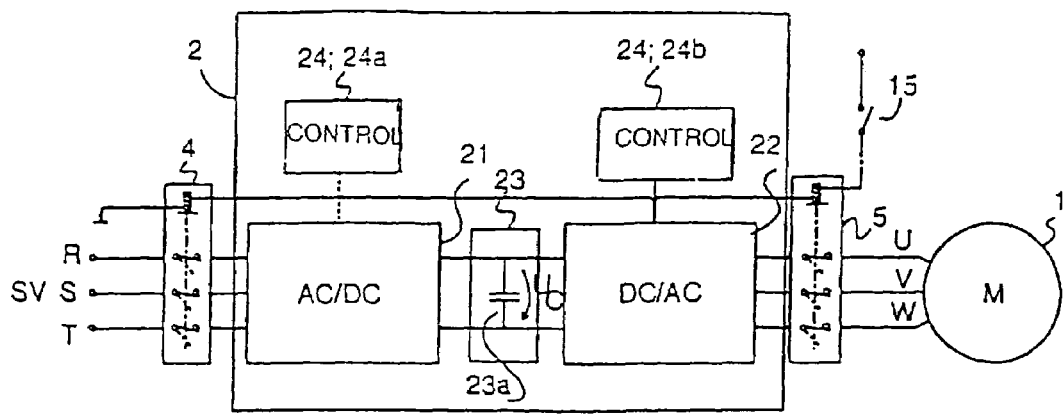
FIG. 1 is a schematic representing a prior-art electric motor drive.
Figure 2:
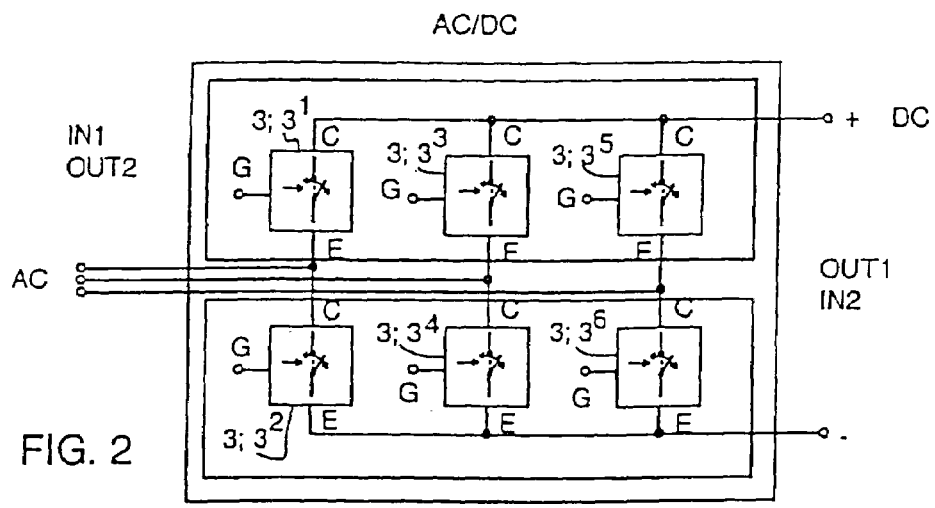
FIG. 2 is a diagram of a rectifier and inverter bridge circuit.
Figure 3:
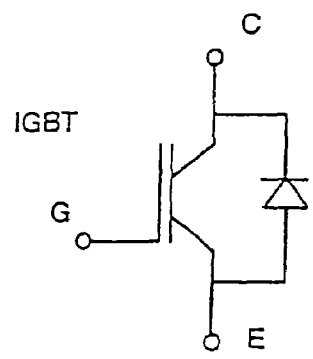
FIG. 3 illustrates an advantageous semiconductor switch suited for the bridge circuit.
Figure 4:
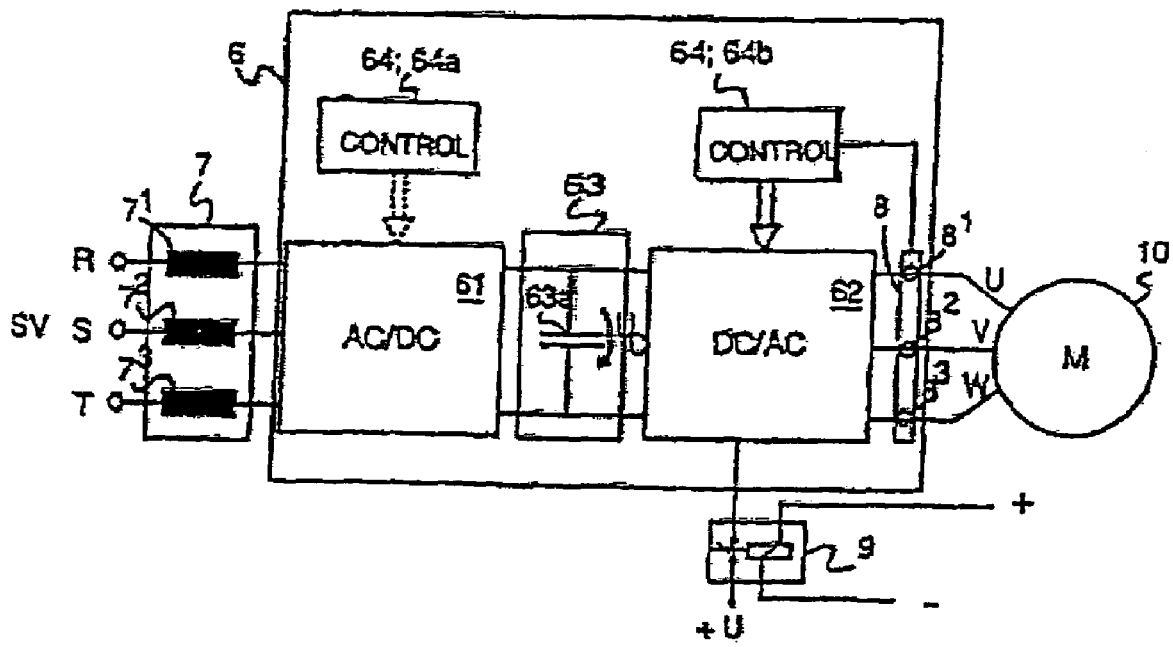
FIG. 4 is a diagram of the input circuit, rectifier and intermediate circuit of an electric motor drive according to the invention.

An electric motor drive according to the invention is visualized in FIG. 4. The electric motor drive is used for regulating and controlling an alternating-current motor, in the present case a three-phase synchronous motor 10. The electric motor drive comprises a frequency converter 6, which again comprises a rectifier 61 and an inverter 62. The rectifier 61 and the inverter 62 are connected to each other via a suitable intermediate circuit 63. The input of the rectifier 61 is connected to an alternating-current power source, such as a three-phase power source, e.g. to an electric network SV, via an inductor unit 7. The inductor unit 7 comprises an inductor $7^1$, $7^2$, $7^3$ connected to each phase R, S, T. The rectifier 61 preferably consists of a bridge implemented using semiconductor switches, such as e.g. the bridge presented in FIG. 2. The output of the rectifier 61 is connected to the intermediate circuit 63. The intermediate circuit 63 comprises at least a capacitor 63a connected between the output terminals of the rectifier 61, the rectified voltage $U_C$ being applied across the capacitor.

According to the invention, the electric motor drive additionally comprises two regulating units. The first control unit comprises the inductor unit 7, which is connected to the input of the frequency converter 6 and thereby to the input of the rectifier 61, and the capacitor 63a of the intermediate circuit 63, which has a low value, of the order of 50 µF.

In the electric motor drive of the invention, the capacitor 63a in the intermediate circuit 63 is a substantially lower-value capacitor than in prior-art electric motor drives. The value of this capacitor has typically been 1000 µF, whereas in the solution of the present invention it is typically of the order of 50 µF, preferably between 10–100 µF. Thus, the value of the capacitor 63a of the intermediate circuit 63 is only 5–10% of the value of the previously used capacitor or even below this value. The use of a large capacitor in the intermediate circuit has been based on the circumstance that, in the case of an emergency stop of the electric motor, the energy stored in the motor has to be discharged somewhere, in this case into a sufficiently large capacitor in the intermediate circuit 63. Reducing the capacitor size again leads to larger voltage variations in the intermediate circuit 63, and this in turn produces an additional stress on the semiconductors of the inverter 62. However, modern semiconductor switches, especially IGBTs, can withstand relatively large voltage variations without suffering damage. In addition, it is to be noted that the size of the intermediate circuit capacitor 63a necessarily has to be reduced in order to allow the electric motor drive to be connected without contactors to a three-phase electric network or equivalent.

The inductors $7^1$, $7^2$, $7^3$ in the inductor unit 7 are connected in series with the phase inputs R, S, T. They are designed especially to limit surge current. At the same time, they are suitably rated to match the capacitor 63a of the intermediate circuit 63.

Figure 5:
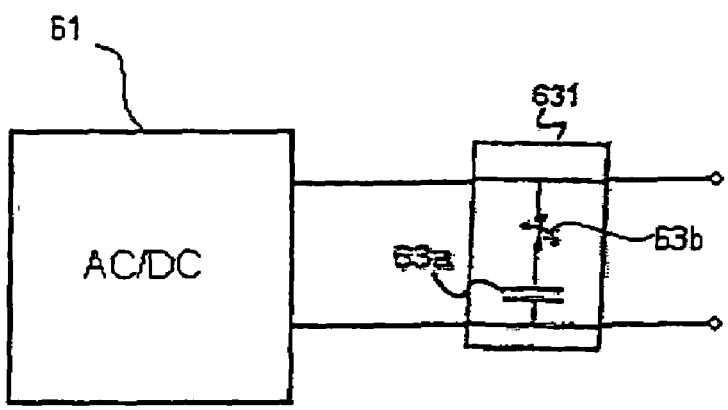
FIG. 5 illustrates an alternative intermediate circuit.

FIG. 5 presents an alternative intermediate circuit 631, which may be considered a direct replacement for the intermediate switch 63 of FIG. 4 and which comprises a switch 63b connected in series with the capacitor 63a between the output terminals of the rectifier 61. By means of this switch, the surge current can be further reduced.

Reducing the value of the intermediate circuit 63 capacitor 63a brings clear advantages. First, the intermediate circuit is now implemented without using a large electrolytic capacitor, which can be regarded as a component subject to wear. Its maximum operating temperature is of the order of 60° C., whereas in the intermediate circuit of the invention it is possible to use e.g. paper capacitors or corresponding dry capacitors, which have an operating temperature e.g. of the order of 90° C. In addition, paper capacitors or corresponding dry capacitors have a clearly longer service life; they are not worn out in use as electrolytic capacitors are. Moreover, reducing the value of the capacitor 63a also has the effect of reducing the harmonic distortion of the electric motor drive, which is a positive feature. In this way, a small torque lag is also achieved. A further advantage is that low-price inductors $7^1$, $7^2$, $7^3$ can now be used in the inductor unit 7.

The frequency converter 6 comprises an inverter control unit 64; 64b, which is used to control the operation of the inverter 62 and further the electric motor 10. The rectifier 61 is preferably implemented using controllable semiconductor switches, such as IGBT, so its functions can be controlled by the rectifier control unit 64; 64a. In this case, too, controlled by the control unit 64; 64b, the inverter 62 produces three-phase voltage and current of controllable frequency for the electric motor 10 so that the rotational speed of the motor can be varied between zero and a predetermined maximum speed. The phase sequence, i.e. the direction of rotation of the motor, is also selected by means of the inverter 62. In normal operation, the inverter 62 is controlled in a manner known in itself, so it will not be discussed here in more detail.

Figure 6:
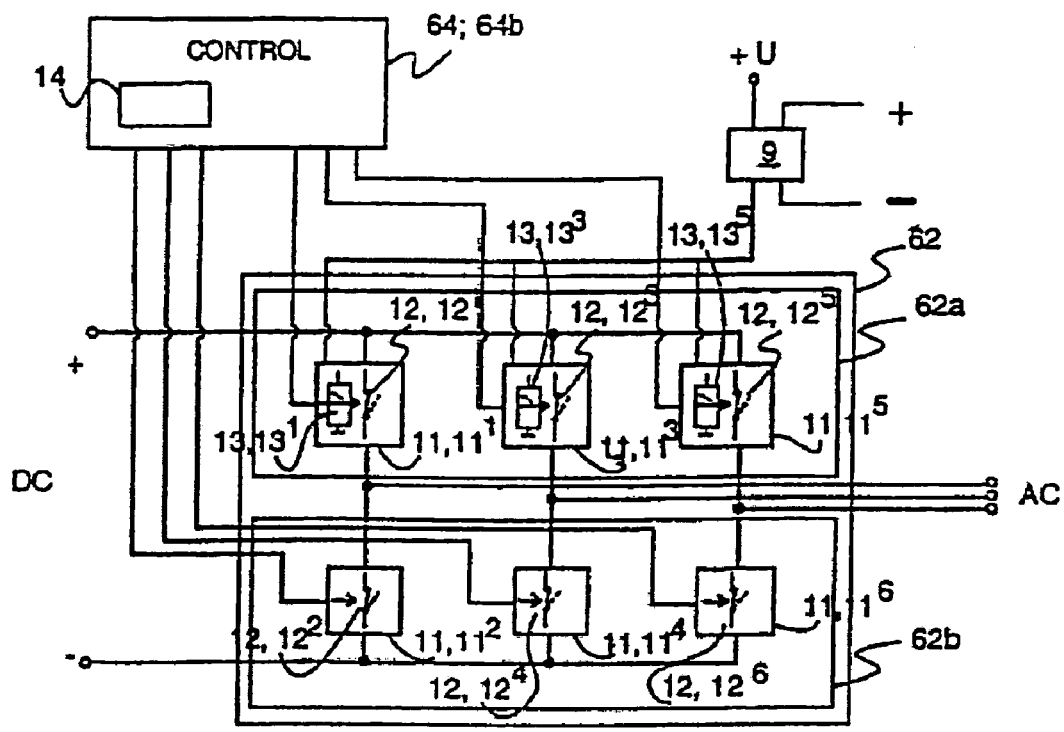
FIG. 6 is a diagram of the inverter used in the electric motor drive of the invention.

A preferred embodiment of the inverter 62 is presented in FIG. 6. The switching units 11 of the inverter 62 are arranged as a bridge, i.e. a bridge circuit, just as in the above-described prior-art inverter. All the switching units 11: $11^1$, $11^2$, $11^3$, $11^4$, $11^5$, $11^6$ in the bridge circuit contain a semiconductor switch 12, preferably an IGBT switch. The bridge circuit of the inverter 62 can be divided into an upper bridge 62a (positive voltage supply side) and a lower bridge 62b (negative voltage supply side).

The second control unit according to the invention comprises an auxiliary switch 13; $13^1$, $13^3$, $13^5$, the power feed to which is arranged to occur via a safety relay 9. In the switching units 11; $11^1$, $11^3$, $11^5$ of the upper bridge 62a, an auxiliary switch 13; $13^1$, $13^3$, $13^5$ is so connected to each semiconductor switch 12; $12^1$, $12^3$, $12^5$ that the control signal for each semiconductor switch will pass via the auxiliary switch when the auxiliary switch is in the conducting state. In addition, the second monitoring unit is provided with a current measuring unit 8 for the measurement of the supply current to the electric motor, and with a current monitoring unit 14 in connection with each semiconductor switch 12; $12^2$, $12^4$, $12^6$ in the lower bridge 62b.

The switching units 11; $11^1$, $11^3$, $11^5$ of the upper bridge 62a thus comprise an auxiliary switch 13; $13^1$, $13^3$, $13^5$, whereas the switching units 11; $11^2$, $11^4$, $11^6$ of the lower bridge preferably only consist of semiconductor switches 12; $12^2$, $12^4$, $12^6$, such as IGBT. The auxiliary switches 13; $13^1$, $13^3$, $13^5$ in each upper bridge switching unit 11; $11^1$, $11^3$, $11^5$ are connected to the control terminal of the corresponding semiconductor switch 12; $12^1$, $12^3$, $12^5$, in this case to the gate G of the IGBT switch. The voltage supply terminal of the auxiliary switch 13; $13^1$, $13^3$, $13^5$ is again connected via a safety relay 9 to a suitable direct voltage U.

The auxiliary switches 13; $13^1$, $13^3$, $13^5$ are arranged to function as follows. In a normal situation, the auxiliary switches 13 are in the conducting state, in other words, the control pulses for the semiconductor switches 12, coming from the control unit 64; 64b, can pass directly from the input IN of the switching unit 11 (FIG. 7) to the control terminal of the actual semiconductor switch, in this case to the gate G of the semiconductor switch IGBT. Depending on the control of each semiconductor switch 12 (conducting/blocked), the direct voltage $U_C$ of the intermediate circuit 13 is either passed through the switch or not; the semiconductor switches 12; $12^1$, $12^3$, $12^5$ work in the normal manner as controlled by the control pulses. In this situation, the safety relay 9 is energized by the voltage and conducting, and so each auxiliary switch 13; $13^1$, $13^3$, $13^5$ is functioning in the normal manner, i.e. conducting. When the safety relay 9 loses the protective voltage, it releases (breaks the circuit) and the supply voltage U to the auxiliary switches 13; $13^1$, $13^3$, $13^5$ disappears, with the result that they stop conducting and current flow through the switch is disrupted. Therefore, the control pulses coming from the control unit 64; 64b can no longer be passed to the corresponding semiconductor switches 12; $12^1$, $12^3$, $12^5$ and the supply of current via the inverter 62 and the phase conductors U, V, W to the electric motor 10 is interrupted.

The supply of current to the electric motor 10 in each phase U, V, W is monitored by a current measuring unit 8 (see FIG. 4). This unit comprises measuring elements $8^1$, $8^2$, $8^3$ fitted to each phase. The current measuring unit 8 is connected to the control unit 64; 64b. Based on the current data obtained from the current measuring unit 8, the supply of current to the electric motor 10 is controlled, and it also provides a reliable way to know when power is interrupted.

The control unit 64; 64b additionally comprises a current monitoring unit 14, which may be e.g. a current monitoring means implemented via software. The switching units 11; $11^2$, $11^4$, $11^6$ comprised in the lower bridge 62b of the inverter 62 are preferably implemented using simple semiconductor switches 12; $12^2$, $12^4$, $12^6$, such as IGBT. These semiconductor switches are controlled by the control unit 64; 64b when the motor is controlled in the normal manner. When the current measuring unit 8 indicates that current is no longer supplied to the motor 10, the current monitoring unit 14 will feed control pulses to the lower bridge switching units 11; $11^2$, $11^5$, $11^6$, whereupon the semiconductor switches 12; $12^2$, $12^5$, $12^6$ of these units start conducting, thus short-circuiting the lower bridge 62b. This action starts dynamic braking of the rotating electric motor 10, so it stops quickly.

Figure 7:
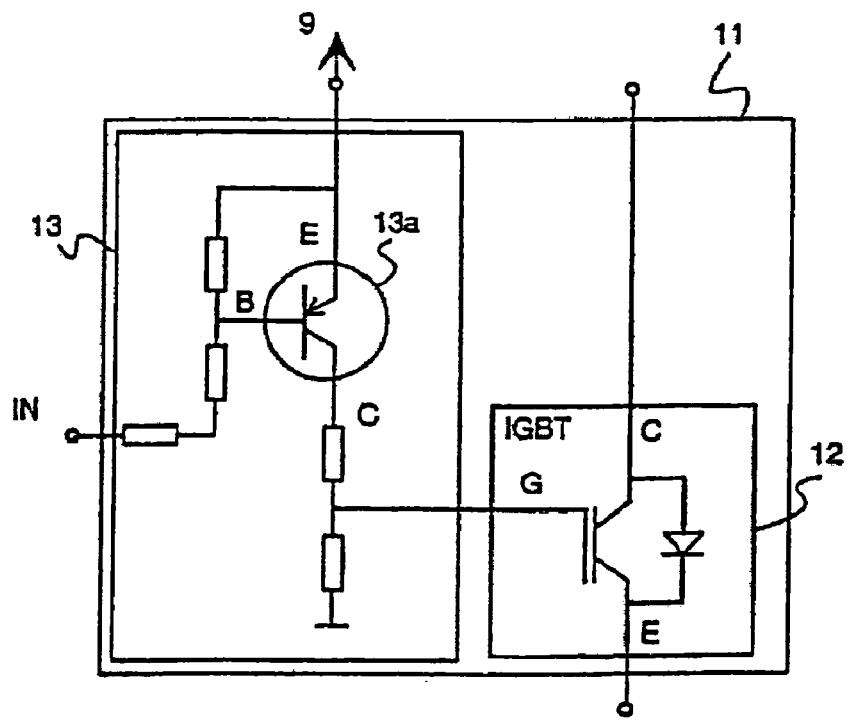
FIG. 7 illustrates the circuit diagram of the semiconductor switch and monitoring unit of the inverter in FIG. 5.

FIG. 7 presents a preferred embodiment of the switching unit 11; 11$^1$, 11$^3$, 11$^5$ of the upper bridge 64a. The auxiliary switch 13; 13$^1$, 13$^3$, 13$^5$ is here implemented simply using a switching transistor 13a. The operating voltage U is connected via the safety relay 9 across the switching transistor 13a of the auxiliary switch 13. The control pulse can be passed from the control unit 64; 64b to the control terminal of the semiconductor switch 12 when the voltage U prevails.

The emitter E of the switching transistor 13a is connected via the safety relay 9 to the voltage U. The collector C is connected to ground via a resistor chain. From the control unit 64; 64b, the control pulse for the semiconductor switch 12, such as IGBT, is applied to the base B of the transistor 13$^1$. From the collector C of the transistor, the control pulse is transmitted undistorted to the control terminal G of the semiconductor switch 12. This is what occurs when the safety relay 9 and its switching unit are in an energized state, permitting the voltage U to be connected to the emitter E of the transistor 13$^1$. When the safety relay 9 is actuated and releases, the passage of the voltage U to the transistor 13$^1$ is blocked, whereupon the transistor stops conducting and the control pulses can no longer pass from its base B to the collector C nor to the control terminal G of the semiconductor switch 12.

Alternatively, the inverter 62 (FIG. 6) can be implemented using a lower bridge 62b that is identical in construction with the upper bridge 62a. In this case, an auxiliary switch 13 is provided in all switching units 11 of the inverter 62. The supply of electricity to all auxiliary switches 13 is arranged to occur via the safety relay 9. The control signal for each semiconductor switch 12 of the switching unit 11 is arranged to pass via the auxiliary switch when the auxiliary switch 13 is in a conducting state, i.e. when the auxiliary switch 13 is supplied with a voltage U via the safety relay 9. When the protective voltage of the safety relay 9 disappears, all the auxiliary switches 13 will stop conducting and no control pulses can reach any of the semiconductor switches 12, so the supply of current to the electric motor 10 is interrupted. In this arrangement, too, a current measuring unit 8 is used in the first place to establish whether a supply current to the electric motor is present or absent. However, this arrangement is not as advantageous as the embodiment example in FIG. 6 because in this case the possibility of dynamic braking is lost.

The invention is not limited to the embodiment example described above; instead, many variations are possible within the scope of the inventive concept defined in the claims.

The invention claimed is:

1. An electric motor drive for driving an alternating-current motor comprising:
   a frequency converter for controlling the electric motor, wherein the frequency converter comprises a rectifier and an inverter;
   an intermediate circuit connecting an output of the rectifier and an input of the inverter for reducing the surge current from the power source; and
   a current measuring unit, in a three-phase network, measuring or monitoring a three-phase current to the electric motor, wherein
   the inverter includes,
   a plurality of inverter contactless switches for controlling the conduction of current for supply to the electric motor, and
   an auxiliary switch connected to selected ones of said inverter contactless switches, the auxiliary switch includes a switching transistor having an emitter, base and collector with the emitter connected to a safety device,
   a control signal input to said auxiliary switch is supplied to the respective inverter contactless switch when the safety device is not actuated, the safety device, when actuated, disabling said respective inverter contactless switch by controlling the conduction of said auxiliary switch so that supply of current to the electric motor by said inverter may be disabled by said safety device.

2. The electric motor drive of claim 1 wherein said motor is an elevator drive motor and where the safety device prevents drive of said electric motor whenever drive of said motor may imperil occupants of the elevator.

3. The electric motor drive according to claim 1, wherein the inverter is connected with the output of the rectifier and the inverter contactless switches are semiconductor switches, the inverter producing three-phase current and three-phase voltage to the electric motor.

4. The electric motor drive according to claim 3, further comprising:
   a control unit for controlling the inverter including a current monitoring unit for supplying control pulses to the semiconductor switches.

5. The electric motor drive according to claim 4, wherein the inverter includes a plurality of switching units each having a semiconductor switch for controllably switching to provide phased power.

6. The electric motor drive according to claim 4, wherein each semiconductor switch is an insulated-gate bipolar transistor (IGBT).

7. The electric motor drive according to claim 5, wherein the safety device is a relay switch,
   the emitter of the switching transistor, connected to the relay switch, receives a voltage supply, when the relay switch is not actuated, where the voltage allows the switching transistor to be in a conducting state,
   the base of the switching transistor receives the control pulses from the control unit, and
   the collector transmits undistorted control pulses to a control terminal of the semiconductor switch to supply current in the three-phase network to the electric motor.

8. The electric motor drive according to claim 1, wherein the intermediate circuit comprises a capacitor connected at an output terminal of the rectifier.

9. The electric motor drive according to claim 8, wherein the intermediate circuit comprises a switch arranged in a series with the capacitor.

10. An electric motor drive for driving an alternating-current motor comprising:
    a frequency converter for controlling the electric motor, wherein the frequency converter comprises a rectifier and an inverter;
    an inductor unit, in a three-phase network, connecting an alternating-current power source to an input of the frequency converter to an input of the rectifier for reducing a surge current from the alternating current power source;
    an intermediate circuit connecting an output of the rectifier and an input of the inverter for further reducing the surge current from the power source; and
    a current measuring unit, in a three-phase network, measuring or monitoring a three-phase current to the electric motor, wherein
    the inverter includes an auxiliary switch that is connected to selected semiconductor switches, the auxiliary switch includes a switching transistor having an emitter, base and collector with the emitter connected to a safety relay, said auxiliary switch is connected to the selected semiconductor switches of said inverter so that a control signal for said selected semiconductor switches will pass via the auxiliary switch when the auxiliary switch is in a conducting state, and the semiconductor switches of the inverter are arranged in a pair of bridges and only one bridge includes at least one auxiliary switch.

11. The electric motor drive according to claim 10, wherein the inverter, connected from the output of the rectifier, includes switching units having the semiconductor switches and produces the three-phase current and a three-phase voltage to the electric motor.

12. The electric motor drive according to claim 10, further comprising:
a current monitoring unit provided in a control unit of the inverter for supplying control pulses to the semiconductor switches in the switching units.

13. The electric motor drive according to claim 12, wherein some of the switching units in the inverter comprise the auxiliary switch connected to the semiconductor switch.

14. The electric motor drive according to claim 12, wherein each semiconductor switch is an insulated-gate bipolar transistor (IGBT).

15. The electric motor drive according to claim 13, wherein the emitter of the switching transistor, connected to the safety relay, receives a voltage supply, when the safety relay is not actuated, where the voltage allows the switching transistor to be in a conducting state,
the base of the switching transistor receives the control pulses from the control unit, and
the collector transmits undistorted control pulses to a control terminal of the semiconductor switch to supply current in the three-phase network to the electric motor.

16. The electric motor drive according to claim 10, wherein the intermediate circuit comprises a capacitor connected at an output terminal of the rectifier.

17. The electric motor drive according to claim 16, wherein the intermediate circuit comprises a switch arranged in a series with the capacitor.

18. The electric motor drive according to claim 16, wherein the capacitor has a value 50 µF.

19. A method for driving an alternating-current motor in an electric motor drive comprising:

controlling the electric motor using a frequency converter;
connecting the alternating-current power source to the input of an inductor in a three phase network unit for reducing a surge current in the power source;
connecting a rectifier and inverter in the frequency converter; and
measuring or monitoring a three-phase current to the electric motor, wherein
the inverter includes an auxiliary switch that is connected to selected semiconductor switches, the auxiliary switch includes a switching transistor having an emitter, base and collector with the emitter connected to a safety relay, said auxiliary switch is connected to the selected semiconductor switches of said inverter so that a control signal for said selected semiconductor switches will pass via the auxiliary switch when the auxiliary switch is in a conducting state, and
the semiconductor switches of the inverter are arranged in a pair of bridges and only one bridge includes at least one auxiliary switch.

20. The method of claim 19, wherein the inverter, connected from an output of the rectifier, includes switching units having the semiconductor switches and produces the three-phase current and a three-phase voltage to the electric motor.

21. The method of claim 19, further comprising:
supplying control pulses to an IGBT semiconductor as each semiconductor switch.

22. The method of claim 20, wherein the switching units in the inverter comprises:
the auxiliary switch connected to the selected semiconductor switches.

23. The method of claim 22, wherein the emitter of the switching transistor receives a voltage supply from the safety relay, when the safety relay switch is not actuated, where the voltage allows the switching transistor to be in a conducting state,
the base of the switching transistor receives the control pulses for controlling the semiconductor switch, and
the collector transmits undistorted control pulses to a control terminal of the IGBT semiconductor switch to supply current in the three-phase network to the electric motor.

* * * * *